United States Patent
Grissom

(10) Patent No.: US 7,426,831 B2
(45) Date of Patent: Sep. 23, 2008

(54) TURBO CHARGING SYSTEM

(75) Inventor: Thomas A. Grissom, Dexter, MI (US)

(73) Assignee: BorgWarner Inc., Auburn Hills, MI (US)

( * ) Notice: Subject to any disclaimer, the term of this patent is extended or adjusted under 35 U.S.C. 154(b) by 150 days.

(21) Appl. No.: 11/245,281

(22) Filed: Oct. 6, 2005

(65) Prior Publication Data

US 2007/0079612 A1   Apr. 12, 2007

(51) Int. Cl.
| F02D 23/00 | (2006.01) |
| F02B 33/44 | (2006.01) |
| F02B 37/007 | (2006.01) |
| F02B 37/013 | (2006.01) |
| F02B 33/00 | (2006.01) |

(52) U.S. Cl. .............. 60/612; 60/602; 123/562
(58) Field of Classification Search ........... 60/612, 60/602; 123/562; F02B 37/007, 37/013
See application file for complete search history.

(56) References Cited

U.S. PATENT DOCUMENTS

| 3,614,259 | A | * | 10/1971 | Neff .............................. 60/602 |
| 4,294,073 | A | | 10/1981 | Neff .............................. 60/597 |
| 4,982,567 | A | * | 1/1991 | Hashimoto et al. ............. 60/612 |
| 5,063,744 | A | | 11/1991 | Ishiyama et al. .............. 60/612 |
| 5,408,979 | A | * | 4/1995 | Backlund et al. ............. 123/562 |
| 6,073,447 | A | * | 6/2000 | Kawakami et al. ............. 60/602 |
| 6,079,211 | A | | 6/2000 | Woollenweber et al. ........ 60/612 |
| 6,311,493 | B1 | | 11/2001 | Kurihara et al. ............... 60/612 |
| 6,694,736 | B2 | | 2/2004 | Pflüger ......................... 60/612 |
| 2004/0134193 | A1 | | 7/2004 | Klingel ......................... 60/612 |
| 2005/0086936 | A1 | | 4/2005 | Bucknell et al. .............. 60/602 |
| 2006/0042247 | A1 | * | 3/2006 | Haugen ........................ 60/612 |
| 2006/0059910 | A1 | * | 3/2006 | Spaeder et al. ................ 60/612 |

FOREIGN PATENT DOCUMENTS

| DE | 101 44 663 A1 | 4/2003 |
| DE | 103 19 594 A1 | 11/2004 |
| DE | 1005025885 A1 | * 12/2006 |
| EP | 1 396 619 A1 | 3/2004 |
| EP | 1640596 A1 | * 3/2006 |
| EP | 1640598 A1 | * 3/2006 |
| WO | WO 91/18190 A | 11/1991 |
| WO | WO 2006050746 A1 | * 5/2006 |

* cited by examiner

*Primary Examiner*—Thai-Ba Trieu
(74) *Attorney, Agent, or Firm*—Warn Partners, P.C.

(57) ABSTRACT

A regulated two-stage turbocharger system is described, including high-pressure and low-pressure turbocharger units. The low-pressure turbocharger unit includes a twin volute turbine portion. The turbocharger system includes a valve system having valve members that are independently controllable so as to selectively control an exhaust gas flow into the twin volutes of the turbine portion of the low-pressure turbocharger unit. By-pass valve systems are also provided for the twin volute turbine portion of the low-pressure turbocharger unit and the compressor portion of the high-pressure turbocharger unit.

24 Claims, 4 Drawing Sheets

TURBO CHARGING SYSTEM

FIELD OF THE INVENTION

The present invention relates generally to turbochargers for use in automotive applications, and more specifically to control systems for use in regulated two-stage and sequential turbochargers.

BACKGROUND OF THE INVENTION

Turbochargers are generally well known in the art. Basically, a turbocharger is a centrifugal air pump that is driven by the engine's exhaust gas. The turbocharger forces an additional amount of air or air-fuel mixture into the engine, which aids in the increase of combustion pressure and engine power. This allows a relatively smaller engine to deliver acceptable fuel economy during normal driving conditions, and to have the increased power characteristics of a larger engine when needed. Turbochargers have been incorporated into both gasoline and diesel engines, for both commercial and passenger vehicle applications.

Examples of turbocharger technology can be found with reference to commonly assigned U.S. Pat. No. 6,089,019 to Roby; U.S. Pat. No. 6,263,672 to Roby et al.; U.S. Pat. No. 6,415,846 to O'Hara; U.S. Pat. No. 6,543,228 to Deacon; U.S. Pat. No. 6,694,736 to Pfluger; U.S. Pat. No. 6,709,160 to Ward et al.; U.S. Pat. No. 6,715,288 to Engels et al.; U.S. Pat. No. 6,802,184 to Huter et al.; and U.S. Patent Application Publication Nos. 2003/0206798 to Allmang et al.; 2004/0037716 to Jaisle; 2004/0062645 to Decker et al.; 2004/0088976 to Jaisle; 2004/0134193 to Klingel; 2004/019447 to Roby; and 2004/0197212 to Roby, the entire specifications of all of which are expressly incorporated herein by reference. Other examples of turbocharger technology can be found with reference to U.S. Pat. No. 4,294,073 to Neff; U.S. Pat. No. 6,079,211 to Woollenweber et al.; U.S. Pat. No. 6,311,493 to Kurihara et al.; and U.S. Patent Application Publication No. 2005/0086936 to Bucknell et al., the entire specifications of all of which are expressly incorporated herein by reference.

A recent development in turbocharger technology has been regulated two-stage or sequential turbochargers, in which two relatively smaller turbocharger units are used instead of a single relatively large conventional turbocharger. These regulated two-stage turbocharger systems typically employ a relatively smaller, high-pressure turbocharger unit in series with a relatively larger, low-pressure turbocharger unit. Unfortunately, conventional regulated two-stage turbochargers still exhibit unsatisfactory characteristics, especially during the overlapping transition period when the turbo speed of the smaller high-pressure turbocharger unit rapidly decreases and the turbo speed of the larger low-pressure turbocharger unit rapidly increases. This phenomenon is believed to be a momentary loss of torque that occurs before the low-pressure turbocharger unit has reached its particular requisite turbo speed. This "drop" in torque during the transition period is quite noticeable and is objectionable to many drivers, especially those driving expensive, high-performance luxury models.

One solution to this problem can be found in commonly-assigned U.S. Provisional Patent Application Ser. No. 60/635,769 to Grissom et al., the entire specification of which is expressly incorporated herein by reference. Grissom et al. described a regulated two-stage turbocharger system that includes high-pressure and low-pressure turbocharger units in communication with one another. The turbocharger system includes a valve system having valve members that are independently controllable so as to selectively control the gas flow into the turbine portions of the high-pressure turbocharger and the low-pressure turbocharger units. The valve members are asymmetric, e.g., they possess differing areas (e.g., perimeters, diameters and/or the like) with respect to one another.

However, a current challenge is to design a turbocharger system that provides active control, as opposed to passive control, of high boost pressure to the engine over a wide range of speed and load conditions. A still greater challenge to maintaining high boost and high engine torque through transient operation is the onset of series compounding from the low pressure stage turbocharger, especially with respect to the operation of the low pressure turbine portion.

Accordingly, there exists a need for new and improved regulated two-stage turbocharger systems that produce a relatively smooth and unnoticeable transition period between the operation of the high pressure and low pressure turbocharger units, especially with respect to the operation of the low pressure turbine portion.

SUMMARY OF THE INVENTION

In accordance with a first embodiment of the present invention, a turbocharger system is provided, comprising: (1) a high-pressure turbocharger system, wherein the high-pressure turbocharger system includes a turbine portion; (2) a low-pressure turbocharger system operably associated with the high-pressure turbocharger system, wherein the low-pressure turbocharger system includes a turbine portion having a first volute and a second volute formed therein, wherein the turbine portion of the high-pressure turbocharger system is in fluid communication with the turbine portion of the low-pressure turbocharger system; and (3) a turbine regulating valve system operably associated with the turbine portion of the low-pressure turbocharger system, wherein the turbine regulating valve system is selectively operable to meter an exhaust gas flow to the first or second volutes.

In accordance with a second embodiment of the present invention, a turbocharger system is provided, comprising: (1) a high-pressure turbocharger system, wherein the high-pressure turbocharger system includes a turbine portion; (2) a low-pressure turbocharger system operably associated with the high-pressure turbocharger system, wherein the low-pressure turbocharger system includes a turbine portion having a first volute and a second volute formed therein, wherein the turbine portion of the high-pressure turbocharger system is in fluid communication with the turbine portion of the low-pressure turbocharger system; (3) a turbine regulating valve system operably associated with the turbine portion of the low-pressure turbocharger system, wherein the turbine regulating valve system includes at least two valve members selectively operable to meter an exhaust gas flow to the first or second volutes; and (4) a turbine by-pass system operably associated with the low-pressure turbine portion, wherein the turbine by-pass system is selectively operable to cause at least a portion of the exhaust gas flow to by-pass the low-pressure turbine portion.

In accordance with a third embodiment of the present invention, a turbocharger system is provided, comprising: (1) a high-pressure turbocharger system, wherein the high-pressure turbocharger system includes a turbine portion and a compressor portion, wherein the turbine portion and the compressor portion are operably associated therebetween; (2) a low-pressure turbocharger system operably associated with the high-pressure turbocharger system, wherein the low-pressure turbocharger system includes a turbine portion having a first volute and a second volute formed therein, and a compressor portion, wherein the turbine portion and the compressor portion are operably associated therebetween, wherein the turbine portion of the high-pressure turbocharger system is in fluid communication with the turbine portion of the low-pressure turbocharger system, wherein the compressor portion of the high-pressure turbocharger system is in fluid communication with the compressor portion of the low-pressure turbocharger system; (3) a turbine regulating valve system operably associated with the turbine portion of the low-pressure turbocharger system, wherein the turbine regulating valve system includes at least two valve members selectively operable to meter an exhaust gas flow to the first or second volutes; (4) a turbine by-pass system operably associated with the low-pressure turbine portion, wherein the turbine by-pass system is selectively operable to cause at least a portion of the exhaust gas flow to by-pass the low-pressure turbine portion; and (5) a compressor by-pass system operably associated with the high-pressure compressor portion, wherein the compressor by-pass system is selectively operable to cause at least a portion of an air flow to by-pass the low-pressure compressor portion.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE INVENTION

The following description of the embodiment(s) of the present invention is merely exemplary in nature and is in no way intended to limit the invention, its application, or uses.

With respect to the use of "fluid," as that term is used herein, it is meant to include any gaseous material including but not limited to air, exhaust gas, and/or the like.

With respect to the use of "fluid communication," as that phrase is used herein, it is meant to include any structure that permits one component to receive and/or introduce a fluid to or into a second component including but not limited to pipes, conduits, tubes, hoses, and/or the like, those terms being used interchangeably herein.

With respect to the use of "gas flow," as that phrase is used herein, it is meant to include any gas flow or stream including but not limited to an air flow, an exhaust gas flow, and/or the like.

Figure 1:
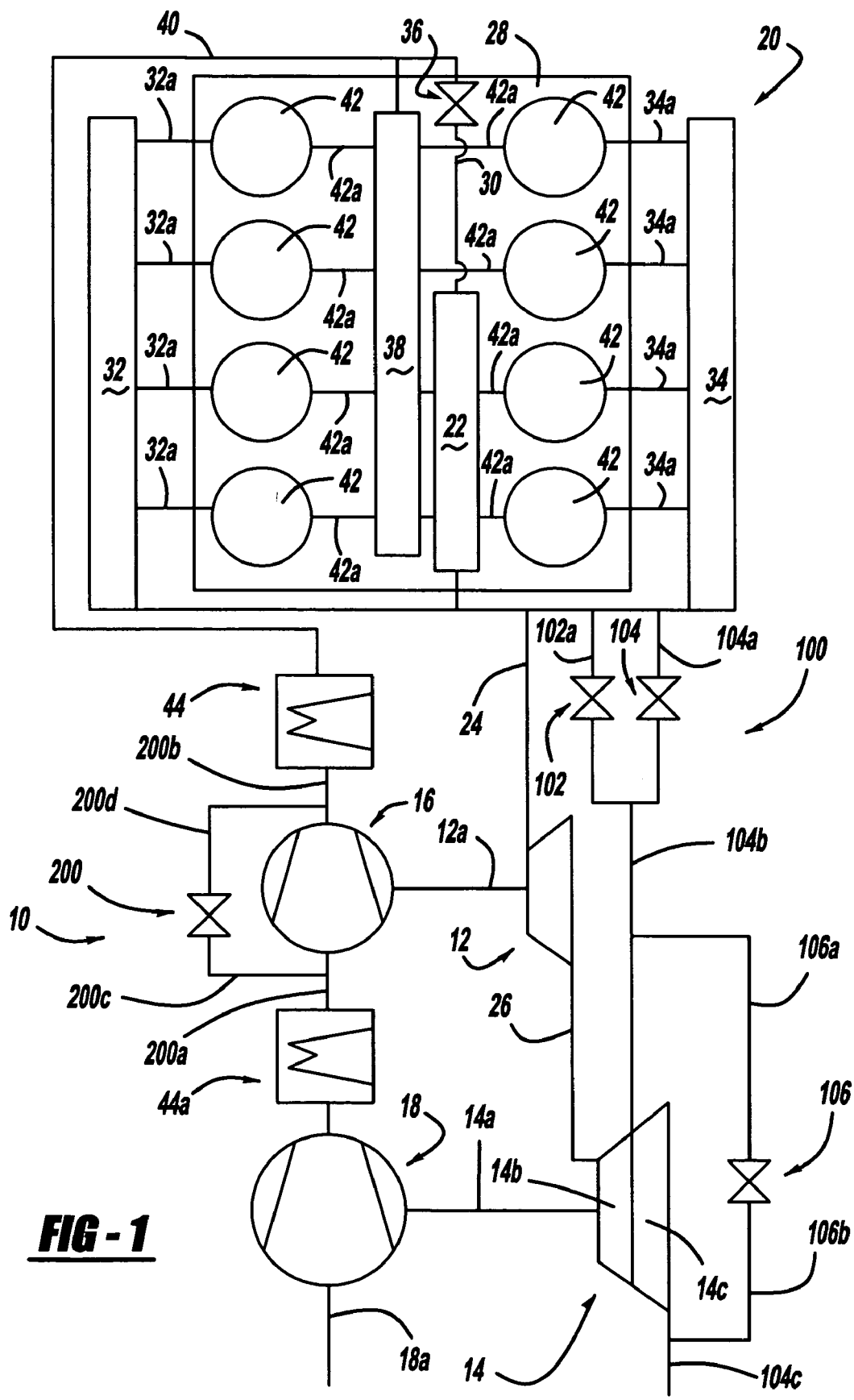
FIG. 1 is a schematic view illustrating a regulated two-stage turbocharger system, in accordance with the general teachings of the present invention.

Referring to the Figures generally, and specifically to FIG. 1, a regulated two-stage turbocharger system is generally shown at 10. The turbocharger system 10 includes two exhaust gas turbine systems 12, 14, respectively. The associated compressor systems 16, 18, respectively, are operably associated with turbine systems 12, 14, respectively, e.g., via shaft members 12a, 14a, respectively. Turbine system 14 includes twin volute portions 14b, 14c, respectively. The volutes 14b, 14c, respectively, have identical cross-sectional areas; however, it should be appreciated that the cross-sectional areas of volutes 14b, 14c, respectively, can be varied so as to be asymmetrical with respect to one another.

The first turbine system 12 is a high-pressure turbine, operably associated with, in fluid communication with, and/or connected in series with the low-pressure turbine system 14. High-pressure turbine system 12 is in fluid communication with an engine system 20, e.g., via an exhaust manifold system 22, e.g., via conduit 24. High-pressure turbine system 12 is in fluid communication with low-pressure turbine system 14, e.g., via conduit 26.

Exhaust manifold system 22 is operably associated and/or in fluid communication with an engine 28, e.g., via conduit 30. In this manner, exhaust gas emanating from the operation of the engine 28, e.g., via exhaust banks 32, 34, respectively, is directed, e.g., via conduits 32a, 34a, respectively, through an optional EGR valve 36 to the exhaust manifold system 22, wherein it can be ultimately directed to the turbocharger system 10. Additionally, an intake manifold system 38 is operably associated and/or in fluid communication with engine 28, e.g., via conduit 40, so as to be able to introduce air into engine system 28, specifically cylinders 42, e.g., via conduits 42a. An optional intercooler system 44 is operably associated and/or in fluid communication with the intake manifold, e.g., via conduit 40. An optional second intercooler system 44a is operably associated and/or in fluid communication with either of the compressor systems 16,18, respectively, e.g., via conduit 200a. Although a V-8 engine system is shown, it should be appreciated that the present invention can be practiced with any type of engine configuration, including but not limited to V-4, V-6, and/or inline engine configurations (e.g., I-4, I-5, I-6 and/or the like).

The present invention employs an optional valve system 100 that is operable to selectively control the flow of exhaust gas to the low-pressure turbine system 14. The valve system 100 is selectively operable to direct gas flow, e.g., exhaust gas flow, into either one or both of the volutes 14b, 14c, respectively. For example, with a twin volute turbine housing associated with the low-pressure stage, exhaust flow from the discharge of the high-pressure stage turbine portion can be directed into a single volute, as opposed to both volutes, of the low-pressure stage turbine portion, thus being operable to better match gas flow conditions/requirements and improve the overall response and performance of the turbocharger system 10.

In accordance with one aspect of the present invention, the valve system 100 is selectively operable to control, either independently or sequentially, at least two turbine regulating valve members 102, 104, respectively, so as to control gas flow (e.g., exhaust gas flow) therethrough, e.g., through volutes 14b, 14c, respectively. The turbine regulating valve members 102, 104, respectively, are in fluid communication with the exhaust manifold system 22, e.g., via conduits 102a, 104a, respectively. The turbine regulating valve members 102, 104, respectively, are also in fluid communication with the low-pressure turbine portion 14, e.g., via conduit 104b. A conduit 104c allows exhaust gas to pass out of the low-pressure turbine portion 14, e.g., to a waste gate or to an exhaust system (not shown). A waste gate or turbine by-pass system (e.g., a valve member) 106 is in fluid communication with conduits 104b and 104c, e.g., via conduits 106a and 106b, the intended purpose of which will be described herein.

By way of a non-limiting example, one of the turbine regulating valve members 102, 104, respectively, could be used to control the gas flow to a particular volute 14b, 14c, respectively. By way of a non-limiting example, turbine regulating valve 102 could control the metering of the gas flow to volute 14c. That is, high-pressure turbine portion 12 can be in fluid communication, e.g., via conduit 26, with only one of the volutes, e.g., 14b, whereas turbine regulating valve member 102 is in fluid communication, e.g., via conduit 104b, with only the other volute 14c. Additionally, the other turbine regulating valve member 104 could be used to only control the metering of the gas flow to waste gate or turbine by-pass valve member 106, e.g., via conduit 106a.

By way of a non-limiting example, the turbine regulating valves members 102, 104, respectively, can be controlled in any number of ways, including mechanically (e.g., springs or other biasable members, lost motion devices, and/or the like), pneumatically, electronically (e.g., through pulse width modulated (PWM) solenoids), or a combination of mechanical, pneumatic, and/or electronic methods. Additionally, additional control mechanisms, such as but not limited to the vehicle's ECU, e.g., in conjunction with appropriate monitoring devices, can monitor and/or control the function of the valve system 100, and more specifically, the turbine regulating valve members 102, 104, respectively.

By way of a non-limiting example, the waste gate or turbine by-pass valve member 106 can be controlled in any number of ways, including mechanically (e.g., springs or other biasable members, lost motion devices, and/or the like), pneumatically, electronically (e.g., through pulse width modulated (PWM) solenoids), or a combination of mechanical, pneumatic, and/or electronic methods. Additionally, additional control mechanisms, such as but not limited to the vehicle's ECU, e.g., in conjunction with appropriate monitoring devices, can monitor and/or control the function of the waste gate or turbine by-pass valve member 106.

An optional compressor by-pass system (e.g., a valve member) 200 is in fluid communication with the high-pressure compressor portion 16, the intended purpose of which will be described herein. The compressor by-pass valve member 200 is also in fluid communication with conduit 200a (which exits from low-pressure compressor portion 18) and conduit 200b (which enters the optional intercooler system 44), e.g., via conduits 200c and 200d. The intended purpose of the compressor by-pass valve member 200 will be described herein. Fresh air is introduced into low-pressure compressor system 18, and components downstream thereof, via conduit 18a.

In accordance with the general teachings of the present invention, the intended operation of the turbocharger systems of the present invention will now be described with specific reference to FIGS. 2-4.

Figure 2:
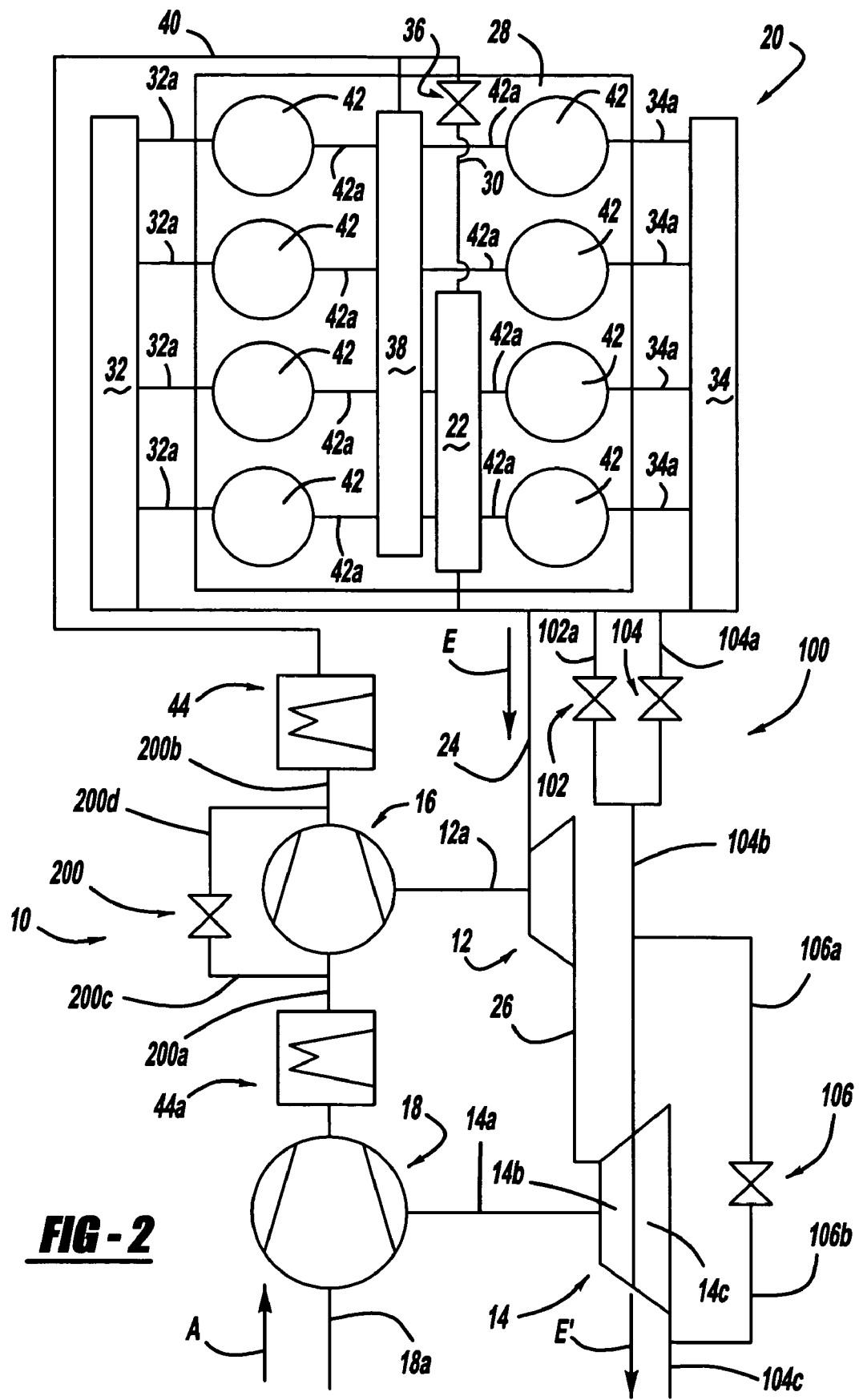
FIG. 2 is a schematic view illustrating of the regulated two-stage turbocharger system depicted in FIG. 1, wherein low engine speed and load conditions are present, in accordance with a first embodiment of the present invention.

Referring specifically to FIG. 2, there is a shown a schematic view illustrating the regulated two-stage turbocharger system depicted in FIG. 1, wherein low engine speed and load conditions are present, in accordance with a first embodiment of the present invention. As the engine speed and load are relatively low, the resulting exhaust mass flow and pressure are also relatively low.

In this view, the engine 28 is running and producing an exhaust gas flow, which is eventually directed through the exhaust manifold system 22. The turbine regulating valves 102, 104, respectively, the waste gate or turbine by-pass valve member 106, and the compressor by-pass valve member 200 are all closed, i.e., an exhaust gas flow cannot proceed therethrough. As previously noted, the active control of these various valve members can be achieved through the use of the vehicle's ECU, as well as various sensors in communication therewith.

As such, the exhaust gas flow has to flow through the high-pressure turbine system 12, in the direction of arrow E. As the high-pressure turbine system 12 is in fluid communication with the low-pressure turbine system 14, e.g., via conduit 26, at least a portion of the exhaust gas flow is introduced into volute 14b of the low-pressure turbine system 14, in the direction of arrow E'. As turbine regulating valves 102, 104, respectively, are closed, there is no exhaust gas flow through volute 14c.

As the high-pressure turbine system 12 increases speed, the associated high-pressure compressor system 16 also increases speed. The low-pressure turbine system 14 also increases speed to a certain extent, albeit to a lesser extent than the high-pressure turbine system 12, and the associated low-pressure compressor system 18 also increases speed to a certain extent, albeit to a lesser extent than the high-pressure compressor system 16. In this manner, fresh air, e.g., coming in from conduit 18a in the direction of arrow A, is compressed, e.g., via low-pressure compressor system 18 and high-pressure compressor system 16, and eventually introduced into the intake manifold 38 of the engine 28.

Figure 3:
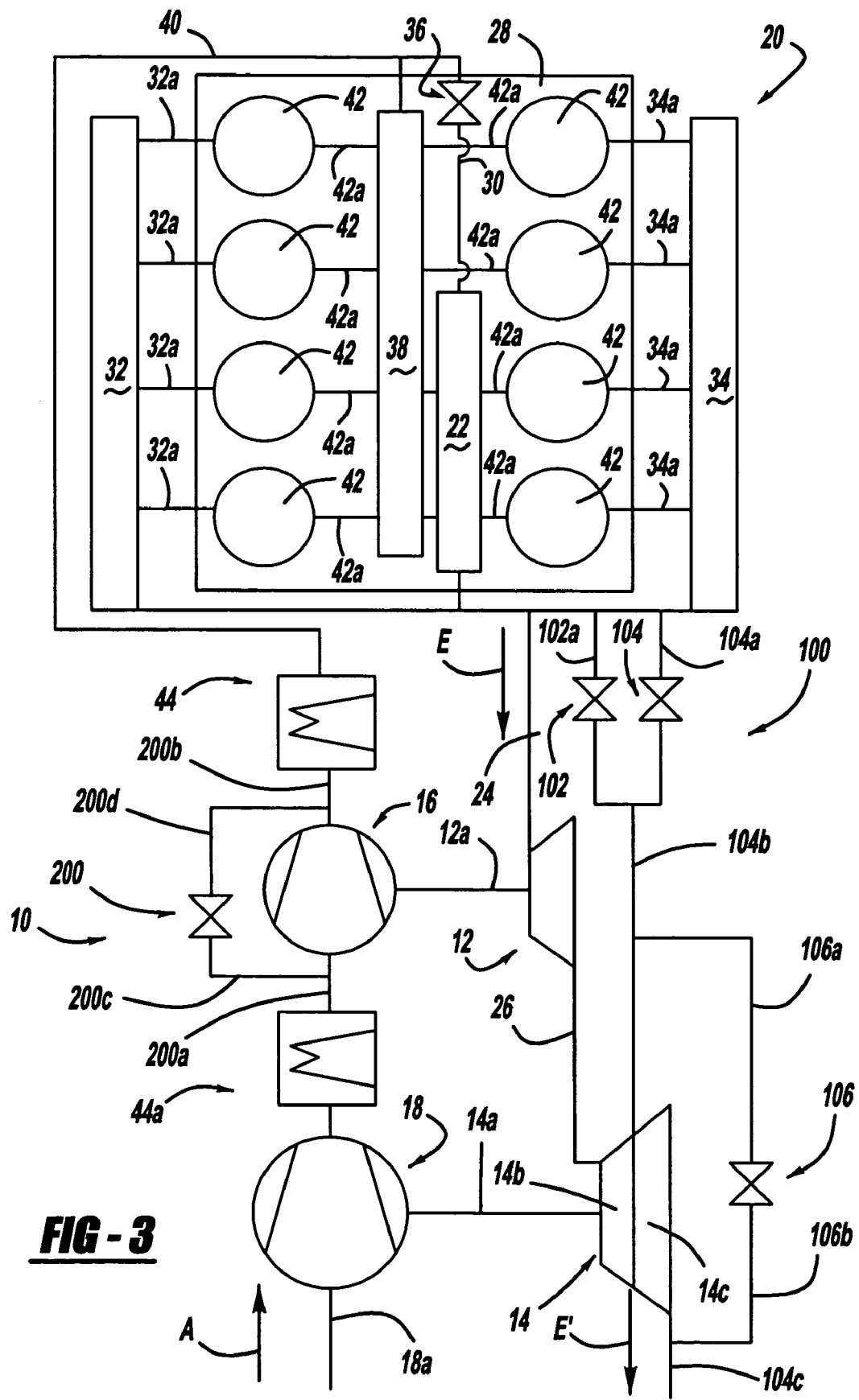
FIG. 3 is a schematic view illustrating of the regulated two-stage turbocharger system depicted in FIG. 1, wherein transitional engine speed and load conditions are present, in accordance with a second embodiment of the present invention.

Referring to FIG. 3, there is shown a schematic view illustrating the regulated two-stage turbocharger system depicted in FIG. 1, wherein transitional engine speed and load conditions are present, in accordance with a second embodiment of the present invention. As the engine speed and load are increasing, the resulting exhaust mass flow and pressure are also increasing.

In this view, the engine 28 is still running and producing an increasing exhaust gas flow, which again is eventually directed through the exhaust manifold system 22. The turbine regulating valve 104, the waste gate or turbine by-pass valve member 106, and the compressor by-pass valve member 200 are all closed, i.e., an exhaust gas flow cannot proceed therethrough. As previously noted, the active control of these various valve members can be achieved through the use of the vehicle's ECU, as well as various sensors in communication therewith. However, turbine regulating valve 102 is open, i.e., an exhaust gas flow can proceed therethrough.

As such, the exhaust gas flow has to flow through the high-pressure turbine system 12 in the direction of arrow E. As the high-pressure turbine system 12 is in fluid communication with the low-pressure turbine system 14, e.g., via conduit 26, at least a portion of the exhaust gas flow is introduced into both volutes 14b, 14c, respectively, of the low-pressure turbine system 14, in the direction of arrow E'.

As the high-pressure turbine system 12 increases speed, the associated high-pressure compressor system 16 also increases speed. The low-pressure turbine system 14 also increases speed to that of around the high-pressure turbine system 12, and the associated low-pressure compressor system 18 also increases speed to an extent of about the high-pressure compressor system 16. In this manner, fresh air, e.g., coming in from conduit 18a in the direction of arrow A, is compressed, e.g., via low-pressure compressor system 18 and high-pressure compressor system 16, and eventually introduced into the intake manifold 38 of the engine 28.

Figure 4:
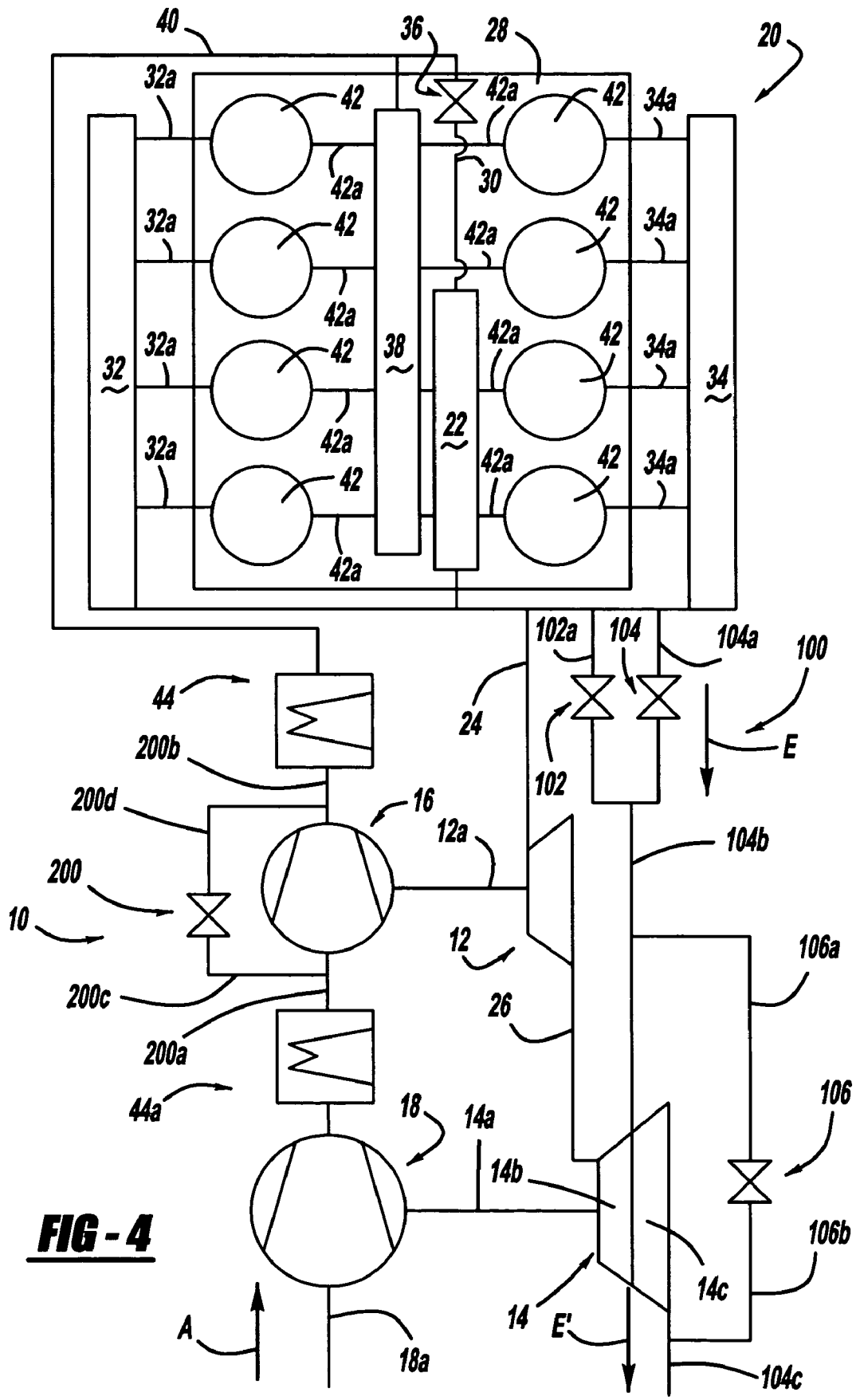
FIG. 4 is a schematic view illustrating of the regulated two-stage turbocharger system depicted in FIG. 1, wherein rated engine speed and load conditions are present, in accordance with a third embodiment of the present invention.

Referring to FIG. 4, there is shown a schematic view illustrating the regulated two-stage turbocharger system depicted in FIG. 1, wherein rated engine speed and load conditions are present, in accordance with a third embodiment of the present invention. As the engine speed and load have reached their maximum levels, the resulting exhaust mass flow and pressure have also reached their maximum levels.

In this view, the engine 28 is again still running and producing a maximum exhaust gas flow, which again is eventually directed through the exhaust manifold system 22. The turbine regulating valves 102, 104, respectively, the waste gate or turbine by-pass valve member 106, and the compressor by-pass valve member 200 are all open, i.e., an exhaust gas flow can proceed therethrough. As previously noted, the active control of these various valve members can be achieved through the use of the vehicle's ECU, as well as various sensors in communication therewith.

As such, the exhaust gas flow, or at least a major portion thereof, does not flow through the high-pressure turbine system 12, i.e., the high-pressure turbine system 12 is essentially by-passed. As the exhaust manifold system 22 is in fluid communication with the turbine by-pass system 100, e.g., via conduits 102a, 104a, respectively, all, or at least a major portion of the exhaust gas flow is introduced into both volutes 14b, 14c, respectively, of the low-pressure turbine system 14, in the direction of arrow E. Because waste gate or turbine by-pass valve member 106 is also open, at least a portion of the exhaust gas flow can by-pass the low-pressure turbine system 14 in the direction of arrow E', e.g., if the exhaust gas flow pressure exceeds a predetermined level that could potentially damage the low-pressure turbine system 14, or any other components of the turbocharger system 10 and/or engine system 20.

As the low-pressure turbine system 14 is at maximum speed, the associated high-pressure compressor system 18 also reaches maximum speed. In this manner, fresh air, e.g., coming in from conduit 18a in the direction of arrow A, is compressed, e.g., via low-pressure compressor system 18, and eventually introduced into the intake manifold 38 of the engine 28. Although the high-pressure turbine system 12 is essentially by-passed, a minimal amount of exhaust gas flow may pass therethrough, which can cause the associated high-pressure compressor system 16 to be actuated to a certain extent. Even if this occurs, the compressor by-pass valve member 200 is open, so that the high-pressure compressor system 16 is by-passed or essentially by-passed. The intended purpose of the compressor by-pass valve member 200 is to prevent damage to the high-pressure compressor system 16 when the high velocity air flow coming from the low-pressure compressor system 18 exits therefrom, e.g., via conduit 200a. Thus, the high velocity air flow can instead travel through conduits 200c, 200d, respectively, into conduit 200b and eventually into the intake manifold 32.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A turbocharger system, comprising:
   a high-pressure turbocharger system, wherein the high-pressure turbocharger system includes a turbine portion;
   a low-pressure turbocharger system operably associated with the high-pressure turbocharger system, wherein the low-pressure turbocharger system includes a turbine portion having a first volute and a second volute formed therein, wherein the turbine portion of the high-pressure turbocharger system is in fluid communication with either the first volute or the second volute of the turbine portion of the low-pressure turbocharger system;
   a turbine regulating valve system having at least two valve members, said turbine regulating valve system operably associated with the turbine portion of the low-pressure turbocharger system, wherein the turbine regulating valve system is controlled by a control mechanism, and the turbine regulating valve system is selectively operable to meter an exhaust gas flow to the first or second volutes based on preselected operating conditions of the control mechanism;
   a turbine by-pass system operably associated with the low-pressure turbine portion, wherein the turbine by-pass system is selectively operable to cause at least a portion of the exhaust gas flow to by-pass the low-pressure turbine portion; and
   one of said at least two valve members is in fluid communication with either of said first or second volutes, and another of said at least two valve members is in fluid communication with said turbine by-pass system.

2. The invention according to claim 1, wherein the high-pressure turbocharger system includes a compressor portion, wherein the turbine portion and the compressor portion of the high-pressure turbocharger system are operably associated therebetween.

3. The invention according to claim 2, wherein the low-pressure turbocharger system includes a compressor portion, wherein the turbine portion and the compressor portion of the low-pressure turbocharger system are operably associated therebetween, wherein the compressor portion of the high-pressure turbocharger system is in fluid communication with the compressor portion of the low-pressure turbocharger system.

4. The invention according to claim 3, further comprising a compressor by-pass system operably associated with the high-pressure compressor portion, wherein the compressor by-pass system is selectively operable to cause at least a portion of an air flow to by-pass the high-pressure compressor portion.

5. The invention according to claim 1, wherein the at least two valve members are operable to independently meter an exhaust flow to the first or second volutes.

6. The invention according to claim 1, wherein the at least two valve members are operable to sequentially meter an exhaust flow to the first or second volutes.

7. The invention according to claim 1, wherein only one of the at least two valve members is in fluid communication with only one of the first or second volutes.

8. The invention according to claim 1, wherein the turbine portion of the high-pressure turbocharger system is in fluid communication with only one of the first or second volutes.

9. The invention according to claim 1, wherein only one of the at least two valve members is in fluid communication with the turbine by-pass system.

10. A turbocharger system for an engine having an electronic control unit, comprising:
    a high-pressure turbocharger system, wherein the high-pressure turbocharger system includes a turbine portion;
    a low-pressure turbocharger system operably associated with the high-pressure turbocharger system, wherein the low-pressure turbocharger system includes a turbine portion having a first volute and a second volute formed therein, wherein the turbine portion of the high-pressure turbocharger system is in fluid communication with either the first volute or the second volute of the turbine portion of the low-pressure turbocharger system;

a turbine regulating valve system operably associated with the turbine portion of the low-pressure turbocharger system, wherein the turbine regulating valve system includes at least two valve members selectively operable to meter an exhaust gas flow to the first or second volutes based on preselected operating conditions and commands received from the electronic control unit;

a turbine by-pass system operably associated with the low-pressure turbine portion, wherein the turbine by-pass system is selectively operable to cause at least a portion of the exhaust gas flow to by-pass the low-pressure turbine portion; and one of said at least two valve members is in fluid communication with either of said first or second volutes, and another of said at least two valve members is in fluid communication with said turbine by-pass system.

11. The invention according to claim 10, wherein the high-pressure turbocharger system includes a compressor portion, wherein the turbine portion and the compressor portion of the high-pressure turbocharger system are operably associated therebetween.

12. The invention according to claim 11, wherein the low-pressure turbocharger system includes a compressor portion, wherein the turbine portion and the compressor portion of the low-pressure turbocharger system are operably associated therebetween, wherein the compressor portion of the high-pressure turbocharger system is in fluid communication with the compressor portion of the low-pressure turbocharger system.

13. The invention according to claim 12, further comprising a compressor by-pass system operably associated with the high-pressure compressor portion, wherein the compressor by-pass system is selectively operable to cause at least a portion of an air flow to by-pass the high-pressure compressor portion.

14. The invention according to claim 10, wherein the at least two valve members are operable to independently meter an exhaust flow to the first or second volutes.

15. The invention according to claim 10, wherein the at least two valve members are operable to sequentially meter an exhaust flow to the first or second volutes.

16. The invention according to claim 10, wherein only one of the at least two valve members is in fluid communication with only one of the first or second volutes.

17. The invention according to claim 10, wherein the turbine portion of the high-pressure turbocharger system is in fluid communication with only one of the first or second volutes.

18. The invention according to claim 10, wherein only one of the at least two valve members is in fluid communication with the turbine by-pass system.

19. A turbocharger system for an engine having an electronic control unit, comprising:

a high-pressure turbocharger system, wherein the high-pressure turbocharger system includes a turbine portion and a compressor portion, wherein the turbine portion and the compressor portion are operably associated therebetween;

a low-pressure turbocharger system operably associated with the high-pressure turbocharger system, wherein the low-pressure turbocharger system includes a turbine portion having a first volute and a second volute formed therein, and a compressor portion, wherein the turbine portion and the compressor portion are operably associated therebetween, wherein the turbine portion of the high-pressure turbocharger system is in fluid communication with either the first volute or the second volute of the turbine portion of the low-pressure turbocharger system, wherein the compressor portion of the high-pressure turbocharger system is in fluid communication with the compressor portion of the low-pressure turbocharger system;

a turbine regulating valve system operably associated with the turbine portion of the low-pressure turbocharger system, wherein the turbine regulating valve system includes at least two valve members selectively operable to meter an exhaust gas flow to the first or second volutes based on preselected operating conditions and commands received from the electronic control unit;

a turbine by-pass system operably associated with the low-pressure turbine portion, wherein the turbine by-pass system is selectively operable to cause at least a portion of the exhaust gas flow to by-pass the low-pressure turbine portion;

a compressor by-pass system operably associated with the high-pressure compressor portion, wherein the compressor by-pass system is selectively operable to cause at least a portion of an air flow to by-pass the high-pressure compressor portion; and one of said at least two valve members is in fluid communication with either of said first or second volutes, and another of said at least two valve members is in fluid communication with said turbine by-pass system.

20. The invention according to claim 19, wherein the at least two valve members are operable to independently meter an exhaust flow to the first or second volutes.

21. The invention according to claim 19, wherein the at least two valve members are operable to sequentially meter an exhaust flow to the first or second volutes.

22. The invention according to claim 19, wherein only one of the at least two valve members is in fluid communication with only one of the first or second volutes.

23. The invention according to claim 19, wherein the turbine portion of the high-pressure turbocharger system is in fluid communication with only one of the first or second volutes.

24. The invention according to claim 19, wherein only one of the at least two valve members is in fluid communication with the turbine by-pass system.

* * * * *